(12) United States Patent
Muhlhoff et al.

(10) Patent No.: US 7,984,646 B2
(45) Date of Patent: Jul. 26, 2011

(54) METHOD OF MEASURING THE THREE-DIMENSIONAL PROFILE OF A GROUND, AND DEVICE FOR IMPLEMENTING SAID METHOD

(75) Inventors: Olivier Muhlhoff, Clermont-Ferrand (FR); Marc Chabry, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 168 days.

(21) Appl. No.: 12/087,029

(22) PCT Filed: Dec. 12, 2006

(86) PCT No.: PCT/EP2006/069604
§ 371 (c)(1),
(2), (4) Date: Nov. 25, 2008

(87) PCT Pub. No.: WO2007/071595
PCT Pub. Date: Jun. 28, 2007

(65) Prior Publication Data
US 2009/0145214 A1 Jun. 11, 2009

(30) Foreign Application Priority Data
Dec. 23, 2005 (FR) ...................................... 05 13390

(51) Int. Cl.
*G01M 17/02* (2006.01)
(52) U.S. Cl. ......................................................... 73/146
(58) Field of Classification Search .................. None
See application file for complete search history.

(56) References Cited

U.S. PATENT DOCUMENTS

| 4,456,829 | A | * | 6/1984 | Fohey | 250/559.23 |
| 4,700,223 | A | | 10/1987 | Shoutaro et al. | |
| 4,786,815 | A | * | 11/1988 | Walker et al. | 250/559.38 |
| 5,790,243 | A | | 8/1998 | Herr et al. | |
| 6,647,636 | B2 | * | 11/2003 | Fukuhara et al. | 33/521 |
| 6,718,248 | B2 | * | 4/2004 | Lu et al. | 701/70 |
| 2002/0176608 | A1 | | 11/2002 | Rose | |
| 2003/0000097 | A1 | | 1/2003 | Docros et al. | |
| 2003/0145477 | A1 | * | 8/2003 | Fukuhara et al. | 33/521 |
| 2003/0236606 | A1 | * | 12/2003 | Lu et al. | 701/70 |

FOREIGN PATENT DOCUMENTS

| EP | 1316779 A1 | * | 6/2003 |
| JP | 58085108 A | * | 5/1983 |
| JP | 2002161511 A | * | 6/2002 |
| JP | 2002-303514 | | 10/2002 |
| JP | 2004101371 A | * | 4/2004 |
| JP | 2006071372 A | * | 3/2006 |
| JP | 2007230267 A | * | 9/2007 |
| SE | 0 400 823 | | 9/2005 |

* cited by examiner

*Primary Examiner* — Andre J Allen
(74) *Attorney, Agent, or Firm* — Cohen Pontani Lieberman & Pavane LLP

(57) ABSTRACT

A method of measuring the profile, in three dimensions, of a pavement on which vehicles fitted with at least one tire may run. A first topographical measurement is carried out on site with a precision of at least one millimeter of an elementary surface of said pavement, then the points of contact between said surface and the tread of a given tire are defined and at least a second topographical measurement of said points of contact is carried out on site so as to obtain a three-dimensional representation, with a resolution of the order of one micron, of the microroughness of said points of contact.

6 Claims, No Drawings

METHOD OF MEASURING THE THREE-DIMENSIONAL PROFILE OF A GROUND, AND DEVICE FOR IMPLEMENTING SAID METHOD

RELATED APPLICATIONS

This is a U.S. National Phase Application under 35 USC 371 of International Application PCT/EP2006/069604, filed on Dec. 12, 2006.

This application claims the priority of French patent application no. 05/13390 filed Dec. 23, 2005, the subject matter of which is hereby incorporated by reference.

FIELD OF THE INVENTION

The invention relates to a method of measuring the profile, in three dimensions, of a pavement on which vehicles can run. It also relates to a device for implementing such a method.

Although not limited to such applications, the invention will be more specifically presented with reference to tires with which vehicles of the automobile type are fitted.

BACKGROUND OF THE INVENTION

When such vehicles are running on roads or else on runways, usually consisting of a pavement of the asphalt or concrete type, the grip properties of the tires with which said vehicle is fitted are fundamental as regards the transmission of accelerating and braking torques and as regards the stability of the vehicle. The term "stability" of the vehicle is understood in particular to mean the guiding or maintaining of the path of the vehicle.

The grip of tires on the pavement which, for example consists of a layer of asphalt, essentially is the result of a phenomenon whereby the rubber compound of the tire tread undergoes indentation by said tread sliding on the asperities of said asphalt layer, which asperities are forced into the surface of said rubber compound. This sliding-induced indentation phenomenon, associated with the hysteretic properties of the rubber compound, which deforms, creates forces, opposed to the sliding, between the tire and the pavement, which result in the tire gripping said pavement.

It is clearly apparent in view of this grip phenomenon that the appearance of the surface of the pavement on which said vehicle runs will play a major role in determining the amount of grip. It is also known to those skilled in the art that the roughness of the pavement, or the size of the asperities of said pavement, has an effect on the amount of grip through the size of the aggregates constituting said pavement and also through the surface finish of said aggregates. The term "macroroughness" is used in relation to the size of the aggregates corresponding to dimensions of the order of one millimeter and the term "microroughness" is used as regards their surface finish, corresponding to dimensions of the order of one micron. The term "medio-roughness" (or intermediate roughness) is also used as being the appearance of the aggregates on a scale intermediate between the two dimensional scales, i.e. of the order of ten microns or so.

It is therefore usual to seek to identify the nature of the pavements on which the vehicles have to run in order to take these parameters into account when designing tires. This type of identification becomes more important when it is necessary to analyze the behavior of a tire rolling on a given pavement.

Thus, methods are known for estimating the profile of a pavement on which vehicles fitted with tires run. It is thus usual to seek to define either the profile in terms of macroroughness, especially for the purpose of establishing the capability of the pavement to remove water in wet weather, or the profile both in terms of macroroughness and microroughness when it is intended to identify the grip of a tire on said pavement.

In particular, on-road measurement techniques are known which consist, for example, in taking an impression using a carbon paper or else simple paper associated with a deposit of ink on the pavement. Such measurements allow the contact area of a tire on a given pavement to be determined from a macroscopic viewpoint. However, such measurements are particularly imprecise and poorly reproducible.

Other known measurement techniques consist in taking a sample of the pavement, for example by a coring technique, so as subsequently to carry out measurements in a laboratory. The measurements carried out may therefore be very precise, including measurements on a scale on the order of one micron. Such methods have the drawback of being destructive, since they require samples to be taken. Since such analysis of the surface of a pavement is advantageously carried out at several randomly selected points so as to obtain a statistical representation of said pavement, it is clear that these destructive methods are of little interest owing to the damage that they cause.

The measurement techniques intermediate between those already described consist in taking an imprint by molding a pavement and then analyzing said molding or a countermolding in the laboratory. The molding may for example be carried out using a material of the dental paste type. It turns out that the materials used limit the analysis of the pavement profile to macroscopic dimensions, the microscopic profile of said pavement disappearing during molding.

Also known, in particular from documents US 2003/0000097, U.S. Pat. No. 5,790,243 and SE 527 952, are two-dimensional measurement methods that consist of many measurements so as to determine a transverse macroscopic profile of a road, in particular the rutting formed by vehicle traffic. The transposition of these techniques to smaller scales, and especially that of the order of one micron as explained above, would in particular require time-dependent deviations such as thermal expansion effects to be overcome. This is because applying such methods with a resolution of the order of one micron would require a number of measurements such that the time needed for the measurements would be very long and would result in a loss of precision owing to environmental physical effects which, over such periods of time, would change sufficiently to create measurement variations that are unacceptable with the required precision.

SUMMARY OF THE INVENTION

One object of the present invention is to provide a method of measuring the profile of a pavement, of the road type, which makes it possible to analyze said surface, in three dimensions, without damaging it and with a precision of the order of one micron. Another object of the present invention is to provide a reliable and reproducible measurement method.

These and other objects are attained in accordance with one aspect of the present invention directed to a method of measuring, in three dimensions, the profile of a pavement on which vehicles fitted with at least one tire can run, in which a first topographical measurement is carried out on site with a precision of at least one millimeter of an elementary surface of said pavement, then in which the points of contact between said surface and the tread of a given tire are defined and in which at least a second topographical measurement of said points of contact is carried out on site so as to obtain a representation, with a resolution of the order of one micron, of the microroughness of said points of contact.

Carrying out the measurement on site means that an operator implements the measurement method directly on the pavement, the method being advantageously non-destructive.

The method of measuring the profile of the pavement in three dimensions according to the invention will thus result in a three-dimensional measurement of the pavement surfaces with which the tread of a tire is liable to be in contact, such as the tops of stones.

The various topographical measurements are advantageously optical, and therefore contactless, methods, incurring no risk of damaging the pavement measured.

An elementary surface of the pavement is a part of the surface of the pavement, the dimensions of which are determined according to the measurement technique employed and according to the experience acquired as regards the tire/pavement interface. This is because a person skilled in the art can in particular determine, according to the objective of said measurement, the useful elementary dimension representative of a pavement. Likewise, he will determine the number of elementary surfaces that the measurement objective requires so as to obtain a satisfactory average statistical representation of the pavement in question.

In accordance with an embodiment of the invention, the measurement method comprises a first step consisting in measuring a profile of an elementary surface of a pavement with a precision of at least one millimeter. Optical measurement techniques for this type of measurement scale are known to those skilled in the art, for example a fringe-projection technique. Such a technique employs a fringe-projection system and an observation camera, both these being connected to a computer unit. The camera observes the deformation of a fringe pattern projected on the pavement and modulated by its relief. The deformed pattern is then compared digitally with a reference pattern, and by calculating the phase shift between the two patterns it is possible to determine the distance of each measurement point from the surface relative to the camera. In this way it is possible to determine the third coordinate Z of a measurement point initially defined by two coordinates X, Y. It is also possible to refine the measurement by projecting in succession several fringe patterns for each point measured. These measurements may thus allow the elementary measured surface of the pavement to be digitized using an appropriate algorithm.

Knowing the characteristics of the tire in question, which are in particular its pressure and its tread design, a second step consists in determining the points of contact between the tire tread and the elementary surface in question.

This determination of the points of contact or the area of contact between the tire and the elementary surface of the pavement is advantageously obtained from the elementary surface digitized during the first step. The points of contact with the tread are thus advantageously defined by means of a calculation algorithm, for modeling said elementary surface of the pavement and by integrating into it one or more characteristics of the tire, such as its pressure, the elastic modulus of the tread and the type of grooving of said tread.

Various methods of determination are then available.

According to a first method, this surface may be determined by a finite-element approach consisting in defining the compression of the rubber compound of the tread on the profile of the pavement, digitized during the first step. Without doubt this is the most precise method, but it is also very lengthy and consequently tricky within the context of the measurement that it is desired to carry out on site.

According to a second method, less precise but much more rapid, the area of contact between the pavement and the tread of a given tire is defined by a percentage of emergent points of the digitized elementary surface obtained during the first step. Various experiments carried out show that an estimated value of these emerging points on the basis of certain characteristics of the tire or of an estimate of said characteristics and the result of the first step lead to satisfactory results. Thus, for passenger vehicles, depending in particular on the tread design and the pressure of the tire, this percentage of emergent points will be chosen to be between 5 and 20%.

A third method, also less precise but more rapid than the first, consists in defining the area of contact between the pavement and the tread of a given tire by considering a depth of indentation of the rubber compound of the tire tread on the relief of the pavement, as digitized during the first step. Thus, for passenger vehicles, this depth of indentation is chosen to be between 0.1 and 0.6 mm.

During a third step, the invention provides a second topographical measurement with a resolution of the order of one micron of said points of contact in order to obtain a representation of the microroughness of said points of contact. Optical measurement techniques for this type of measurement scale are known to those skilled in the art, for example a white-light-interferometry technique which results in a three-dimensional representation of the measured surface. Such a technique is based on the detection of coherence peaks created by two polychromatic wavefronts that interfere with each other. The surface of a point of contact is illuminated by white light, which is split into two parts using a beam splitter. That part not directed onto the surface of the point of contact is directed onto a reference surface. The reflections from each of these parts are combined and the interference pattern is recorded by a camera. Since the intensity is a maximum when the path difference between the two beams is zero, the reference surface is translated and images are taken at regular intervals. By analyzing the variation in the intensity of each point it is possible to determine the Z coordinate of a point, the X, Y coordinates of which are defined. Other three-dimensional measurement techniques are for example fringe-projection methods and photogrammetry (or stereovision) methods. Two-dimensional measurements using confocal-microscope or laser-triangulation tools could be envisaged. Such measurements would require a large number of iterations in order to achieve information quality close to that of a measurement carried out in three dimensions, provided that, on the one hand, the problems of repositioning the measurement sensors are solved and, on the other hand, all the physical phenomena that may cause a potential deviation, such as thermal expansion, are taken care of. In practice, this type of measurement method is not applicable for obtaining relevant measurements on a scale of one micron, the problems associated with repositioning and with physical phenomena being virtually impossible to solve.

In accordance with the invention, the results of the first measurement, of macroscopic type, and more precisely the formation of a digital representation of the elementary surface, make it possible to determine the points of contacts between the pavement and the tread in which the microscopic measurement with a resolution of the order of one micron is necessary. These two-step measurements therefore lead to more complete information.

The method according to the invention furthermore saves a considerable amount of time since the measurements of the latter step are limited on the surface to the useful zones relative to the complete surface that represents the elementary surface.

To implement the second measurement, owing to the precision required for said measurement with a resolution of the order of one micron and the need to change apparatus, it is necessary to calibrate the second apparatus relative to the first. This may be carried out by any means known to those skilled in the art, the condition to be met being that the same reference frame is used for both measurements.

With regard to the measurement techniques used above, the results obtained and their precision were completely unexpected. This is because topographical measurements with a precision of the order of one micron are usually carried out in a laboratory, the measurement tools being installed on earthquake-proof concrete slabs. In view of the results, the inventors consider that the in situ measurements are realizable because of the nature of the pavements, for example of the asphalt or concrete type, which are produced for covering roads, runways and other surfaces on which vehicles fitted with tires run. It seems that the nature of these materials is quite sufficient to absorb the vibrations provided that the phenomena causing these vibrations, such as the passing of vehicles, are away from the measurement zones by a few tens of meters.

However, the measurements are advantageously carried out screened from the environmental conditions so that phenomena such as wind, rain or sunshine do not disturb the measurements.

The invention advantageously provides a variant in which at least a third measurement is carried out on site so as to obtain a representation, with a precision of the order of ten microns or so, of the medio-roughness of said points of contact.

Optical measurement techniques for this measurement scale are known to those skilled in the art, for example a fringe projection technique similar to that for the first measurement which leads to a three-dimensional representation. As in the case of the second measurement, other three-dimensional measurement techniques are possible, for example photogrammetry (or stereovision) methods. Two-dimensional measurements using confocal-microscope or laser-triangulation tools could also be envisaged. However, the precision of the order of ten microns or so of this measurement entails the same provisos as those above in the case of the second measurement.

This third measurement is in fact an intermediate measurement in terms of dimensions relative to the aforementioned first two measurements. According to the invention, the first measurement thus allows the elementary surface to be defined by the presence of stones and by gaps separating them and thus makes it possible to obtain the points of contact between pavement and tire tread. The third measurement defines the medio-roughness of the stones and therefore their shape, but the second measurement enables the microroughness of said stones to be determined with a resolution of the order of one micron.

As in the case of the second measurement, the third measurement is carried out on the basis of the digitization of the elementary surface and the definition of the area of contact after the first measurement has been carried out. In the same way too, the third measurement is carried out in the reference frame of the first measurement in order to benefit from knowing the points of contact and to measure only the zones of interest, thus enabling this third measurement to be carried out as rapidly as possible.

According to a preferred embodiment of the invention, the elementary area of the pavement has an area of at least 5cm$^2$ and advantageously at least 10 cm$^2$. Below this value, experiments have shown that the results obtained are not always representative of the pavement that it is desired to measure.

Also preferably according to the invention, the measurement area corresponding to the third measurement of the points of contact is between 2 mm$^2$ and 1 cm$^2$ and advantageously between 4 and 30 mm$^2$, this similar area range being satisfactory for obtaining a statistical representation of the elementary surface. However, it is possible to carry out the third measurement on several points of contact so as to obtain even more representative statistical results.

Also preferably, according to the invention, the measurement area corresponding to the second measurement of the points of contact is between 0.01 and 2 mm$^2$ and advantageously between 0.04 and 1 mm$^2$. This measurement range is especially defined by the tools currently available for achieving a satisfactory resolution/precision compromise.

Another aspect of the invention is directed to a device for the on-site measurement of the profile, in three dimensions, of a pavement on which vehicles fitted with at least one tire can run, said device comprising a first measurement tool for measuring with a precision of at least one millimeter and at least a second optical measurement tool for measuring with a precision of the order of one micron, said device further including at least one computer and further including a means for protecting against the environmental conditions.

According to a preferred embodiment of the invention, the first measurement tool is a measurement of the fringe projection type.

Also preferably, the second measurement tool is of the white-light interferometry type.

According to a variant embodiment of the invention, the device includes a third optical measurement tool for measuring with a precision of the order of ten microns or so, such as a measurement tool of the fringe projection type.

The various optical measurement tools are advantageously installed in succession and operated by one and the same controller, which is itself controlled by a computer which operates the second and third tools in particular on the basis of the measurements carried out by the first tool.

As mentioned above, the inventors have been able to demonstrate, against all expectations, that such tools, and especially the optical measurement tool with a precision of the order of one micron, may be used to carry out on-site measurements. However, it is very useful in most cases for the device to include a protection means, for protecting it from environmental conditions such as rain, wind and sunshine. This is because it is of fundamental importance that in particular the optical measurement tool with a precision of the order of one micron not be disturbed during the measurements by the environmental conditions.

According to one advantageous embodiment of the invention, the environmental protection means is a fabric, such as a tent, hermetically sealed around its periphery and at its top. However, it is open on its base and therefore has no bottom, so as to allow the measurements on the pavement, but hermetically linked to the latter over its periphery.

Another advantage of the device, owing to the tools needed to implement it, is that it can be easily transported, especially in a car, allowing simple access to a road or runway. The compact tool also has the advantage of being able to be transported by aircraft.

The simplicity of use of the device according to the invention also allows rapid measurements to be carried out. This contributes to the feasibility of carrying out these measurements directly on site.

Other details and advantageous features of the invention will become apparent below from the description of an exemplary embodiment of the invention.

DETAILED DESCRIPTION OF EMBODIMENTS OF THE INVENTION

Trials were carried out so as to determine the profile of a road, the pavement of which was made of asphalt, so as to be able to interpret grip and wear results on a tire of a passenger vehicle, and more precisely to have an expertise appraisal of these results.

The purpose of these trials was actually to interpret results obtained when rolling on a given pavement. These trials may allow the observed grip or wear phenomena to be better understood. They may for example make it possible to understand or explain an operation of a tire that differs locally from what is usually observed. Measurements carried out on a pavement may also allow the design of a tire intended for rolling on this type of pavement to be optimized.

As mentioned previously, analysis of a pavement according to the invention takes place in several steps.

According to an embodiment of the invention, a first step consists in identifying the elementary surfaces of said pavement on which the measurements are performed. These elementary surfaces must be representative of the largest zones in terms of grip and wear. A person skilled in the art will thus define the number of elementary surfaces, their dimensions and their locations. It is clear that he will rely on his experience acquired as regards the tire/pavement interface.

During each of the measurements or analyses that will be described below, a device such as a bottomless tent is placed around the measurement apparatus in order to protect its use from the environmental conditions.

For each of the elementary surfaces thus defined, a first analysis is performed using a fringe-projection system associated with an observation camera. Within the trials context, this is a camera set to make measurements on elementary areas equal to 60 $cm^2$. A measurement is carried out every tenth of a millimeter in order to define the Z coordinate of a point already defined by its X, Y coordinates so as to obtain a topography of the elementary surface analyzed with a precision of the order of one millimeter. The time taken to analyze an elementary surface is about 40 seconds.

Starting from these measurements, a computer provided with suitable software makes a digital representation of the elementary surface. This three-dimensional digitized surface is used to define the actual area of contact of the tire tread with said surface. To define this actual area of contact and more precisely the points of contact of said elementary surface with the tread of a given tire, an indentation of the tread of the tire equal to 0.3 mm is considered. Digital processing of the digitized surface thus results in the set of contact points.

Starting from these contact points, a second analysis is carried out using a fringe-projection system associated with an observation camera. Within the context of the trials, this is a second apparatus set to make measurements on areas of 10 $mm^2$. This apparatus is used to make measurements from a selection of the contact points. A measurement is made every two microns in order to define the Z coordinate of a point already defined by its X, Y coordinates so as to obtain a topography of the analyzed surfaces selected from the contact points. During the trials, these second measurements were carried out on about 20 surfaces selected from the contact points. The results obtained provide a topography or profile of the surfaces selected from the contact points with a precision of the order of ten microns or so. The time to analyze each selected surface is about 20 seconds.

The second analysis is carried out taking into account the first analysis and its measurements, especially so as to install the second measurement tool and to calibrate its initial position as a function of the position of the contact points identified in a given reference frame. These operations are carried out by means of a controller which is itself controlled by a computer.

Again starting from the contact points, a third analysis is carried out using a white-light-interferometry system. This apparatus is used to make measurements from a selection of the contact points on an area of 0.04 $mm^2$. A measurement is made every 0.4 microns in order to define the Z coordinate of a point already defined by its X, Y coordinates so as to obtain a topography of the analyzed surfaces, selected from the contact points. During the trials, these third measurements are carried out on about 20 surfaces selected from the contact points. The results obtained provide a topography or profile of the surfaces selected from the contact points with a precision of the order of one micron. The time taken to analyze each selected surface is about 10 minutes.

The analysis operations using the interferometer are also carried out using the same controller controlled by a computer, the operation being performed in particular on the basis of the measurements carried out during the first analysis.

The combination of the operations described above allowing the pavement to be characterized lasts two hours.

The results obtained, integrated in tools for modeling the tire/pavement interface, may provide a better understanding or interpretation of certain grip and wear phenomena occurring when tires are rolling.

The analysis of a pavement thus described may also allow intervention upstream in the development of a tire intended to roll on a given type of pavement, as is the case for example in competition around a circuit.

The invention has been more particularly described with reference to tires for automobiles, but it applies more generally to any type of tire, and especially tires for motorcycles, aircraft, lorries, etc. It also applies more generally to any type of pavement on which this type of vehicle may run. It may in particular be a pavement of the asphalt or concrete type, as already mentioned, or else a pavement of the following types: draining bituminous mix, bituminous concrete, resin pavement, etc.

The invention claimed is:

1. A method of measuring, in three dimensions, the profile of a pavement on which vehicles fitted with at least one tire can run, comprising the steps of:
    performing a first topographical measurement on site with a precision of at least one millimeter of an elementary surface of said pavement;
    defining the points of contact between said surface and the tread of a given tire; and
    performing at least a second topographical measurement of said points of contact is carried out on site so as to obtain a representation, with a resolution of the order of one micron, of the microroughness of said points of contact.

2. The method of measuring according to claim 1, wherein the points of contact with the tread are defined by means of a calculation algorithm for modeling said elementary surface of the pavement and by integrating into it characteristics of the tire, such as its pressure, the elastic modulus of the tread and the type of grooving of said tread.

3. The method of measuring according to claim 1, wherein at least a third measurement is carried out on site so as to obtain a three-dimensional representation, with a resolution of the order of ten microns or so, of the medio-roughness of said points of contact.

4. The method of measuring according to claim 1, wherein the elementary surface of the pavement has an area of at least 5 cm$^2$.

5. The method of measuring according to claim 3, wherein the measurement area corresponding to the third measurement of the points of contact is between 2 mm$^2$ and 1 cm$^2$.

6. The method of measuring according to claim 1, wherein the measurement area corresponding to the second measurement of the points of contact is between 0.01 and 2 mm$^2$.

* * * * *